United States Patent
Allmann et al.

(10) Patent No.: US 6,641,162 B2
(45) Date of Patent: Nov. 4, 2003

(54) GLIDE BOARD FOR SKIING

(75) Inventors: Andreas Allmann, Unterwasser (CH); Franz Scherubl, Straubing (DE)

(73) Assignee: Volkl Sports GmbH & Co. KG (DE)

( * ) Notice: Subject to any disclaimer, the term of this patent is extended or adjusted under 35 U.S.C. 154(b) by 0 days.

(21) Appl. No.: 09/864,453

(22) Filed: May 25, 2001

(65) Prior Publication Data
US 2002/0008365 A1 Jan. 24, 2002

(30) Foreign Application Priority Data

Jun. 9, 2000 (DE) ........................ 100 28 188
Nov. 21, 2000 (DE) ........................ 100 57 904
Dec. 16, 2000 (DE) ........................ 100 62 884

(51) Int. Cl.$^7$ ................................ A63C 5/00
(52) U.S. Cl. .................. 280/607; 403/381; 403/282
(58) Field of Search ................. 280/601, 603, 280/607, 608, 609, 14.21, 14.22, 618; 403/381, 282

(56) References Cited

U.S. PATENT DOCUMENTS

| 4,089,612 A | * | 5/1978 | Mazzeo | 403/361 |
| 5,035,443 A | * | 7/1991 | Kincheloe | 280/618 |
| 5,141,243 A | * | 8/1992 | Meatto | 280/602 |
| 5,297,812 A | * | 3/1994 | Dogat et al. | 280/633 |
| 5,595,396 A | * | 1/1997 | Bourdeau | 280/607 |
| 5,664,901 A | * | 9/1997 | Mayr | 403/297 |
| 6,015,161 A | * | 1/2000 | Carlson | 280/626 |
| 6,113,126 A | * | 9/2000 | Zanco et al. | 280/610 |
| 6,217,041 B1 | * | 4/2001 | Hauser et al. | 280/14.2 |
| 6,557,866 B2 | * | 5/2003 | Jones et al. | 280/14.22 |

FOREIGN PATENT DOCUMENTS

| DE | 4016102 | * | 11/1990 |
| DE | 4041402 | * | 7/1991 |
| EP | 383104 | * | 8/1990 |

* cited by examiner

Primary Examiner—Brian L. Johnson
Assistant Examiner—Bryan Fischmann
(74) Attorney, Agent, or Firm—Hoffman, Wasson & Gitler PC

(57) ABSTRACT

A glide board, especially a ski or snowboard, is provided with a profile rail system on the top of the board at least in the area of the binding consisting of at least one profile rail extending in the longitudinal direction of the glide board and serving to fasten functional elements, for example a binding or elements thereof or a binding plate, by pressing functional elements onto the rail.

9 Claims, 6 Drawing Sheets

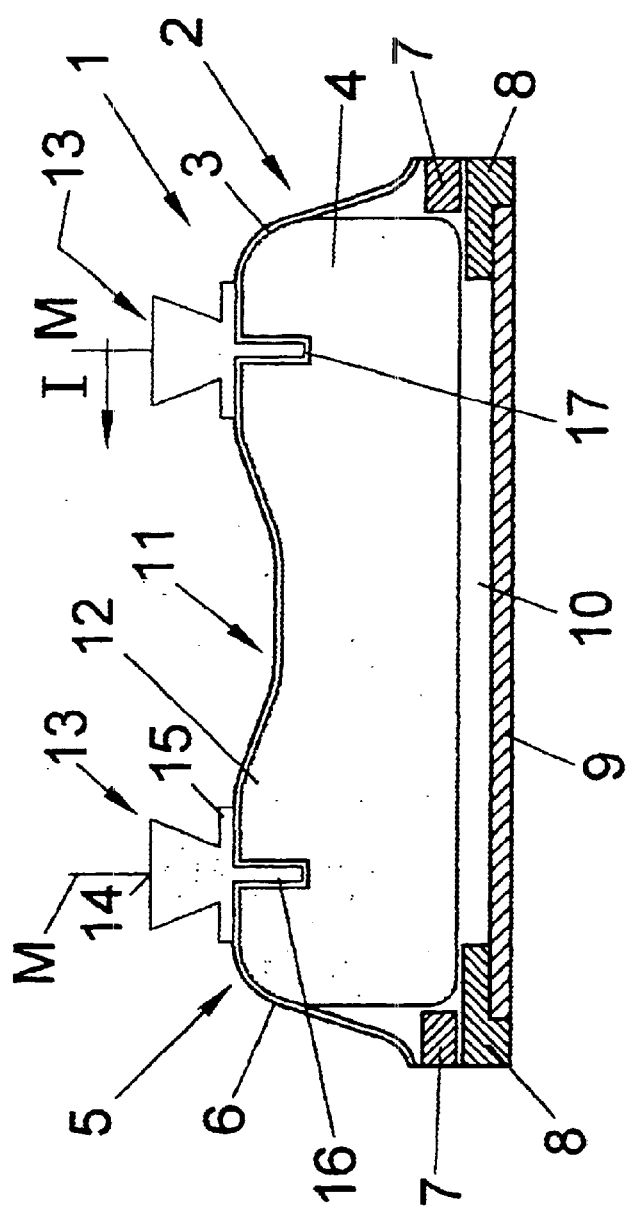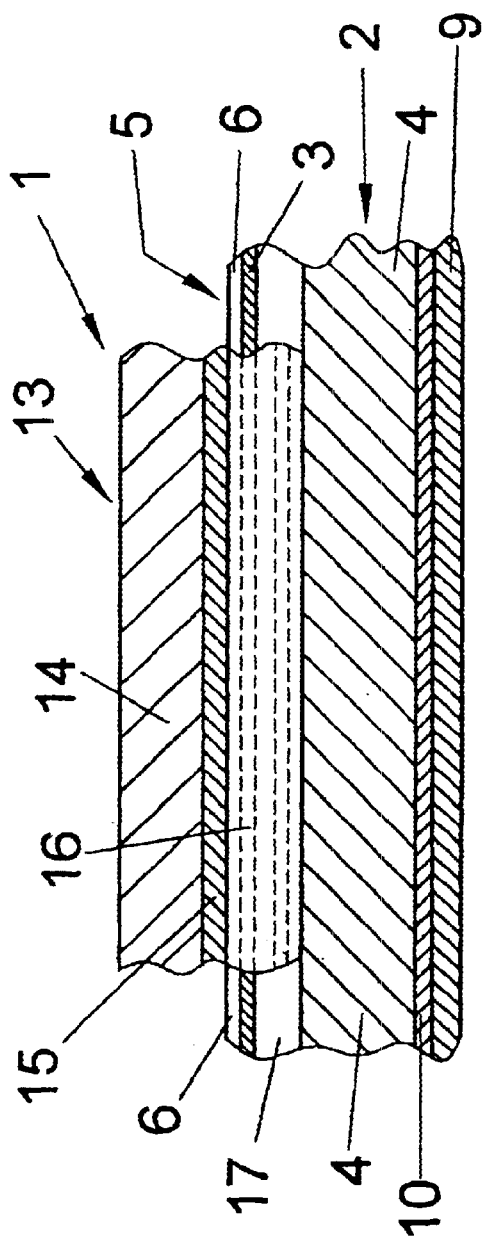

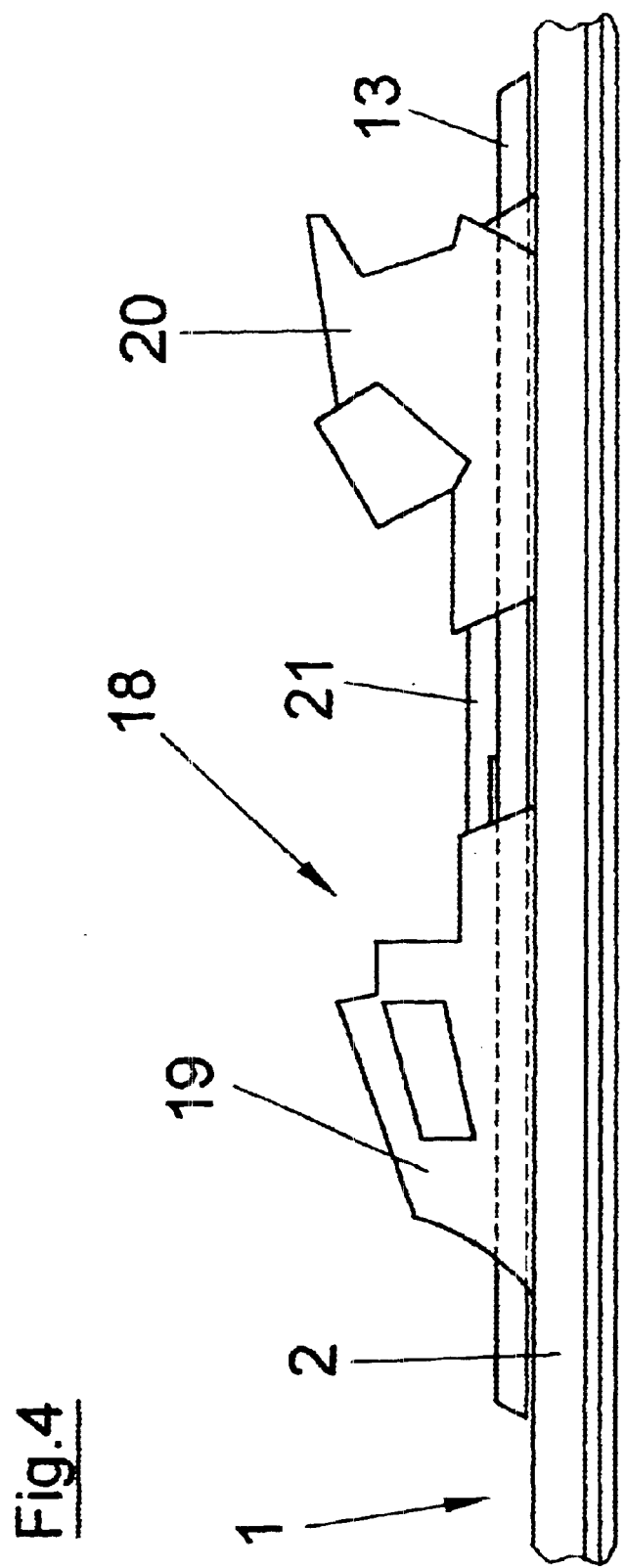

GLIDE BOARD FOR SKIING

BACKGROUND OF THE INVENTION

The invention pertains to glide boards, especially skis or snowboards, and to a profile rail system.

It is common practice to fasten binding plates on skis, for fastening the actual ski binding, using a profile rail system. This includes two parallel profile rails, which are located on top of the ski oriented in the longitudinal direction of the ski and fastened by means of fastening screws.

The disadvantage of this practice is the large number of fastening screws necessary for fastening the profile rails to the ski body. Among other things, this complicates the assembly process and it also requires a relatively large cross section for the profile rails in order to provide the holes necessary for the fastening screws. Furthermore, there is a risk of the profile rails being deformed due to tightening of the screws, resulting in an enlarged cross section at the location of the screws, making the attachment of the binding plates to the profile rails difficult or impossible.

An object of the invention is to prevent this problem by exemplifying a glide board with an improved profile rail system.

SUMMARY OF THE INVENTION

In the invention, at least one profile rail is connected permanently to the ski body by at least one further, formed profile or peg section by means of a peg connection, also by means of additional gluing. The assembly of the profile rails preferably takes place during the manufacture, or during pressing of the glide boards. The embodiment according to the invention has numerous advantages. They include the fact that a very precise and homogeneous connection between the profile rails and the glide board bodies is achieved, and that the cross section of the profile rail can be kept small, which helps considerably to reduce the weight and improve the appearance. Furthermore, optimum function and performance (direct transfer of force, optimum flex compensation, etc.) are achieved. Furthermore, optimum function and performance (direct transfer of force, optimum flex compensation, etc.) are achieved.

Further basic advantages of the invention include the optimal technical and visual integration of the glide board binding or binding plate system, and high versatility of the system due to the possibility of fastening different types of binding or binding plates simply by sliding them on. Finally, the embodiment according to the invention presents a comprehensive and convincing technology for the user.

In a further general embodiment of the invention, the binding of the glide board is fastened to the at least one profile rail on the glide board by sliding it on as a fully functional unit. This embodiment offers the additional advantage of fast and easy assembly of the binding or the binding unit, by simply sliding it on and then fastening it. A screw connection is no longer necessary for attaching the binding.

BRIEF DESCRIPTION OF THE DRAWINGS

The invention is described in more detail below based on the following figures:

FIG. 1 is a simplified representation in cross-section of a glide board for snow in the form of a ski with a rail system on the top of the ski for fastening various functional elements, such as binding plates, bindings, binding arrays, and the like;

FIG. 3 is a cross-section corresponding to line 1—1 of FIG. 1;

FIG. 4 is a partial representation in side view of the ski in FIG. 1, together with a binding attached directly to the rail system;

DETAILED DESCRIPTION OF THE INVENTION

Figure 2:
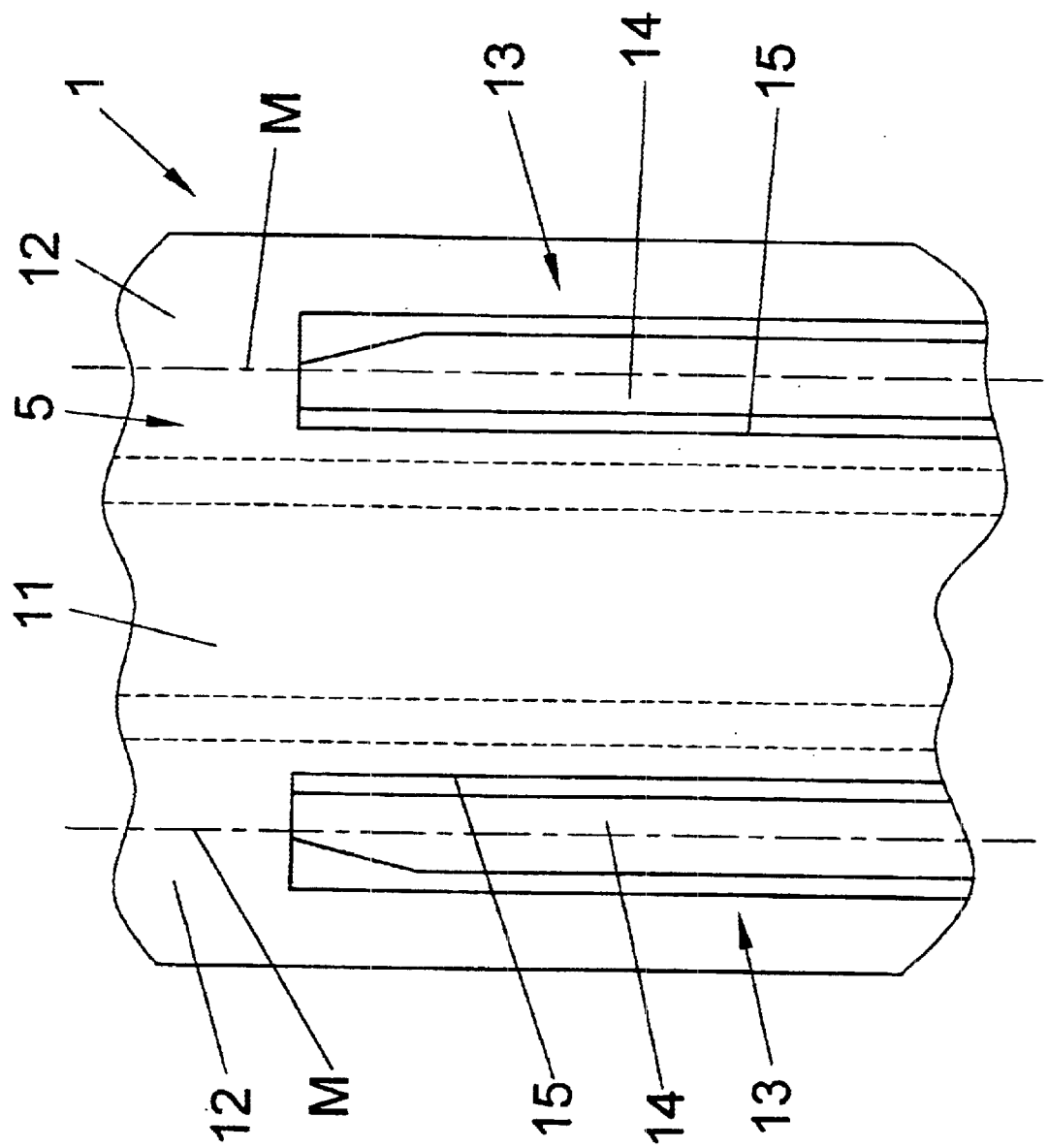
FIG. 2 is a simplified partial representation in top view of the ski in FIG. 1.

The figures depict a ski 1, the body 2 of which has the usual construction, for example the core 4 enclosed by a torsion box 3, the shell forming the ski top 5 and also partially the longitudinal sides of the ski 1, the lower longitudinal edges of which extend to the top of a side face 7, the running surface element consisting of the two steel edges 8 and the running surface 9 located between them and the lower longitudinal binding element 10 above it. The shell 6 at least on the ski top 5 is made of a suitable material in such a way that it functions as an upper longitudinal binding element.

The ski body 2 is formed in such a way that, at least in the binding area on the ski top 5, it has a groove-like depression 11 extending in the middle in the longitudinal direction of the ski. On each side of this groove 11, a raised area 12, is provided, extending in the longitudinal direction of the ski, directly connecting the top to the respective Longitudinal sides of the ski 1. On each raised area 12, a profile rail 13 is fastened, thereto, that extends in the Longitudinal direction of the ski and is made of a suitable, extremely stable material, such as metal or an extremely stable plastic. The two rails 13 are arranged parallel to each other and at a distance from each other. In the depicted embodiment, each rail 13 has a profile that is symmetrical to a middle plane M extending in the longitudinal direction of the rail. The two rails 13 are arranged parallel to each other and at a distance from each other. In the depicted embodiment, each rail 13 has a profile that is symmetrical to a middle plane M extending in the longitudinal direction of the rail.

As shown in FIG. 1, each rail 13 has an upper profile section 14 that forms undercuts on its two longitudinal sides for the tight-fitting fastening of a functional element. For this purpose, the profile section, in the depicted embodiment, has a trapezoidal or dovetail-shaped profile, so that the width of the profile section 14 becomes smaller as the distance from the open top increases. The profile section 14 merges into profile section 15, which is a flat strip, extends beyond profile section 14 somewhat and lies in a plane perpendicular to the middle plane M with its top side. Connected to profile section 15 is a bar-like profile section 16, that lies parallel to the middle plane M with its top side and forms a peg profile. The profile sections 14, 15 and 16 in the depicted embodiment all extend along the entire length of the respective rail 13.

The respective rail 13 is fastened to the ski body 2 by means of a glue/peg or leg connection using profile section 16, which has for this purpose on its top surface a profile for improving the connection or anchoring, for example, with a surface profile providing a barbed effect and which is inserted into a slot in the ski body 2 that is open on the ski top 5 and anchored there by gluing for the purpose of fastening the respective rail 13.

With its bottom side facing profile section 16, the profile section 15 forms an abutment or bearing surface with which the rail 13 bears against the ski top 5 and which also precisely defines the height at which the rail 13 extends beyond the top 5 during assembly. The profile section 15 also serves as a bearing surface for the functional element held to the profile rails 13 (e.g. binding plate with binding, or binding) and as an additional support for the large-surface transfer of forces and torsions from the functional element to the ski top 5.

The described peg connection of the rails 13 by the formed profile section 16 has many advantages, especially in comparison with a screw connection. First of all, it provides a connection over a greater length. The profile of the respective rail 13 can be kept very small, and especially also the profile section 14, since the rail 13 and the profile section 14 do not require penetrating fastening screws that would necessarily increase the cross section. Furthermore, undesired deformations of the rails 13 and therefore especially of the profile sections 14 are prevented, which are inevitable during the tightening of fastening screws. A further, decisive advantage is the fact that the anchoring of the respective rail 13 by means of the profile section 16 takes place in an area of the core 4 that is reinforced by the stable shell 6, at least on the ski top 5, in such a way that it can accept high forces, especially high tensile forces, therefore enabling the secure anchoring of the respective profile rail 13. Altogether, this embodiment of the invention provides a very precise and homogeneous connection between the respective rail 13 and the ski body 2, making the connection suitable for the acceptance of extremely high forces.

On at least one end, the rails 13, or their profile sections 14, are beveled so as to make it especially easy to slide the respective functional element onto the rails 13. This beveling is indicated by 14' in FIG. 2.

FIG. 4 shows a binding 18 that has a front binding element 19, a rear binding element 20, and binding plate 21, that in the depicted embodiment connects the binding elements 19 and 20, or on which the binding elements 19 and 20 are located, in either case in such a way as to enable the size adjustment or sole length adjustment, i.e. the adjustment of the distance between the front binding element 19 and the rear binding element 20. In the area of the binding elements 19 and 20, the binding 18 has fastening grooves on the bottom with a profile that corresponds to the profile of the profile section 14, of the rails 13, so that the binding 18 can be pushed onto the rails 13 in the direction of arrow A for a tight fit with these fastening grooves and be held tightly to these rails 13. For the attachment of the binding 18 to the ski 1, which after production is already provided with the rails 13, one only has to connect the binding 18 onto the rails 13 and prevent it from sliding lengthwise in a suitable manner, such as by clamping it to the rails 13 and/or by inserting at least one securing screw in the ski body 2, etc.

For this purpose, the fastening of the binding plate 21 to the rails 13 is to be provided for at only one area, for example in the middle of the binding plate, so as to enable relative movement between the rear binding element 20 and the ski by sliding of the binding plate on the rails 13 in the longitudinal direction of the rails during bending of the ski 1.

With the binding 18 depicted in FIG. 4, the fastening grooves that work together with the rails 13 are provided for on elements of the front binding element 19 or the rear binding element 20, whereas the binding plate 21 only forms the support surface for the ski boot and connects the two binding elements 19 and 20 at a distance.

In general, it is also possible to design the binding plate 21 so that it is held onto these rails by pushing it with the grooves corresponding to the profile of the profile sections 14 and the binding elements 19 and 20 are then fastened on the top of the plate in a suitable manner.

In the above description, it was assumed that the profile section 16 is a continuous section along the entire length of the rail 13. In general, it is also possible for the profile section 16 to be non-continuous, e.g. consisting of several single peg sections that are connected to each other in the longitudinal direction of the rail.

Figure 5:
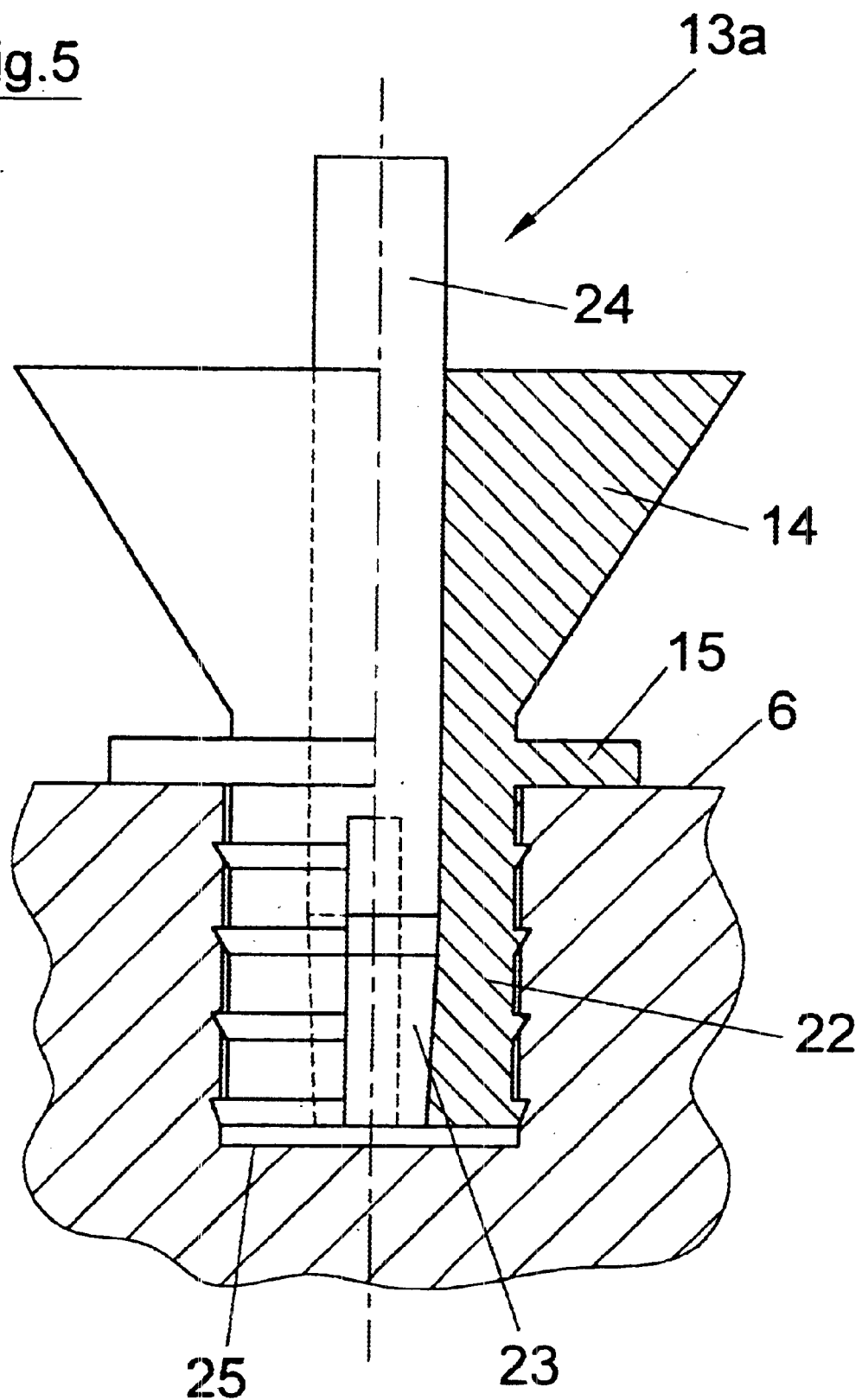
FIG. 5 is an enlarged representation of a longitudinal cross-section through one of the rails in a further embodiment of the invention.

FIG. 5 shows an enlarged cross-section of a rail 13a that has a function equivalent to that of rail 13 and together with a further rail 13a forms the profile rail system for fastening functional elements of a binding or a binding plate not depicted. The rail 13a includes the profile sections 14 and 15. For fastening the rail 13a to the ski body 2, several expanding pegs 22 are molded consecutively onto the rail 13a in longitudinal direction, which (pegs), in the depicted embodiment, are slotted and have a narrowing hole 23 toward the free end of the respective peg 22, which (hole) is also open on the top side of the profile section 14. An expanding bolt 24 is pre-mounted in the respective hole 23, or is molded on by at least one predetermined breaking point. After attaching the rail 13a to the ski body 2, i.e. after inserting the peg 22 into holes 25 provided for on the ski body, the single expanding bolts 24 are then pressed or hammered into the narrowing part of the holes 23 during expanding of the pegs 22.

Figure 6:
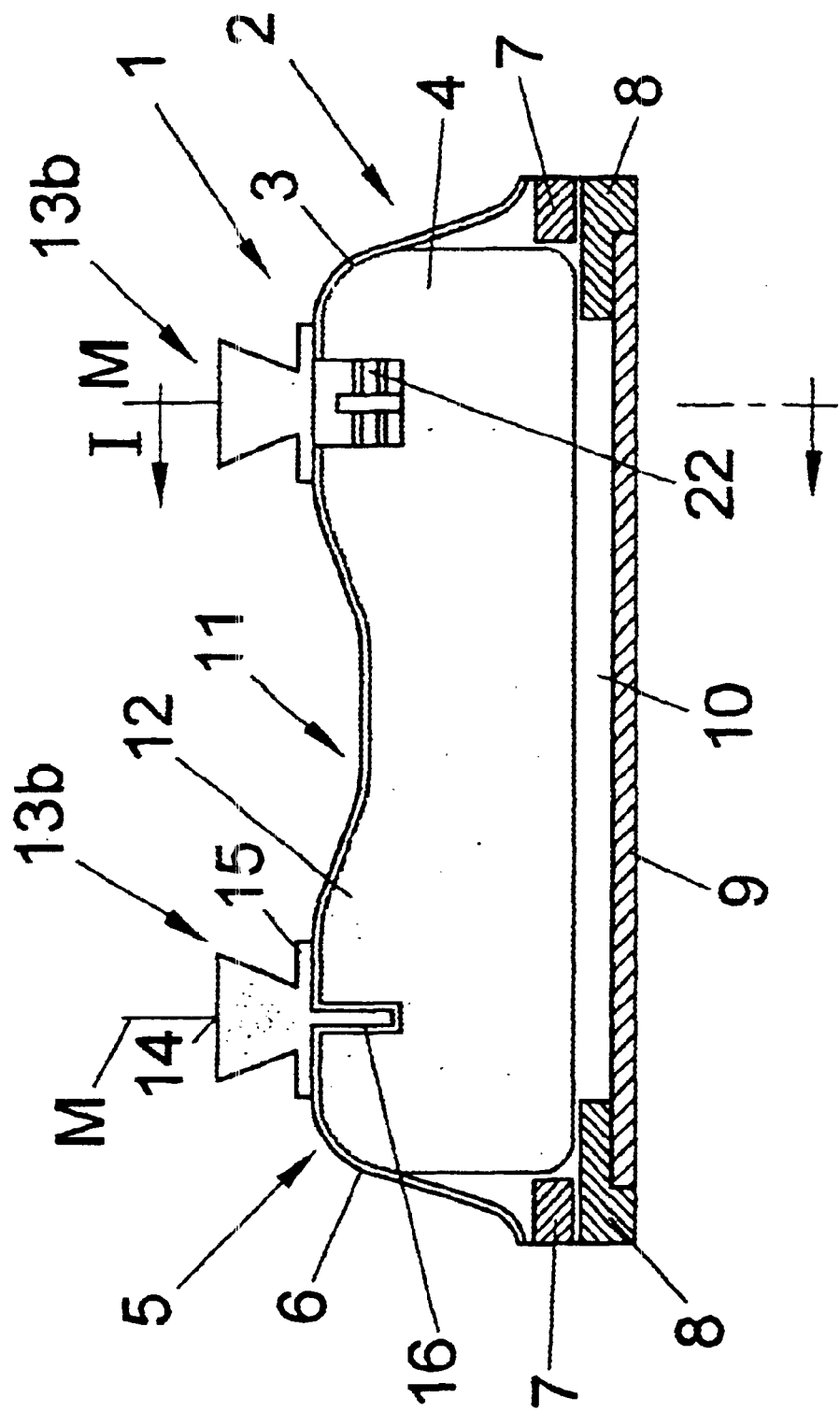
FIG. 6 is a simplified representation in cross-section of an alternate embodiment of the invention.
Figure 7:
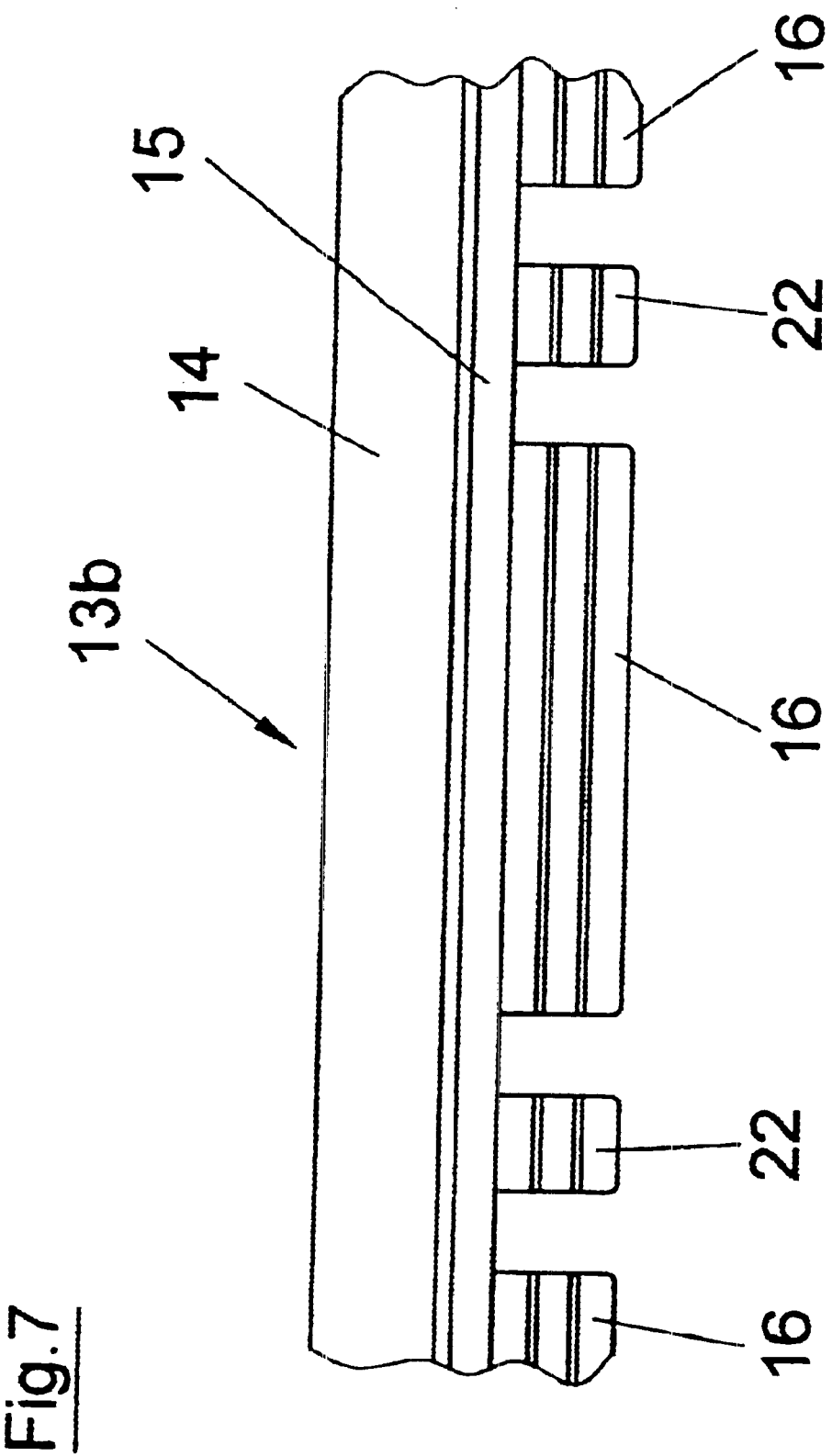
FIG. 7 is a cross-section corresponding to line 1—1 of FIG. 6.

As shown in FIGS. 5 and 6, it is also possible here to combine the expanding pegs and the strip-shaped or bar-shaped profile section 16, consecutively in the longitudinal direction of the profile section 13b, whereby the beginning and end of each profile section 14 is at distance from the adjacent expanding peg 22. This combination provides, in addition to the expanding peg connection by the pegs 22, anchoring and the transfer of lateral forces applied crosswise to the profile rail 13b along an extended length by means of the bar-like profile sections 16.

The above description of the rail system was based on a ski. Of course, this system can also be used for other glide boards, for example snowboards, for fastening functional elements, e.g. bindings, binding plates, etc. on the top the board.

The invention was described above based on a number of representative embodiments. Numerous adaptations, modifications are possible without abandoning the underlying inventive idea.

List of reference numbers 1 ski
2 ski body
3 torsion box
4 core of ski
5 top of ski
6 shell
7 side face
8 steel edge
9 running or sliding surface
10 lower longitudinal binding element 11 depression
12 raised area
13, 13a, 13b rail
14, 15, 16 profile section
17 fastening slot
18 binding
19, 20 binding element
21 binding plate
22 expanding peg or pin
23 hole
24 expanding bolt
25 hole
M middle

What is claimed is:

1. A glide board, comprising:
a profile rail system applied on a top of the board, the profile rail system having two profile rails extending in the longitudinal direction of the board, and
a binding or binding plate fastened directly to the top of the board by being pushed onto the profile rails, the profile rails being parallel,
wherein there is a depression extending in the longitudinal direction between the two profile rails.

2. A glide board, comprising:
a profile rail system applied on a top of the board, the profile rail system having two profile rails extending in the longitudinal direction of the board, and
a binding or binding plate fastened directly to the top of the board by being pushed onto the profile rails, the profile rails being parallel,
wherein
each profile rail has a first profile section, with a profile forming at least one undercut and on which the binding or binding plate is held with a positive fit after being pushed thereon and at least one second profile section forming at least one peg, the at least one peg and first profile section being manufactured as one piece.

3. The glide board according to claim 2, wherein each profile rail has a third profile section, between the first profile section and the at least one peg wherein the third profile section forms a support surface of each profile rail on the top of the board.

4. The glide board according to claim 2, wherein the first profile section has a dovetail profile.

5. The glide board according to claim 2, wherein the second profile section has a continuous form.

6. The glide board according to claim 2, wherein a glued peg connection is used for attaching the at least one peg to the body of the board.

7. A glide board, comprising:
a profile rail system applied on a top of the board, the profile rail system having two profile rails extending in the longitudinal direction of the board, and
a binding or binding plate fastened directly to the top of the board by being pushed onto the profile rails, the two profile rails being parallel,
wherein the two profile rails are fastened at a raised area of the top of the board.

8. The glide board according to claim 7, wherein the two profile rails are made of metal or plastic.

9. The glide board according to claim 7, wherein the binding has a front binding element and a rear binding element that together form a functional unit by means of a binding plate that is fastened to the two profile rails as a fully functional unit by pushing it onto the top of the board.

* * * * *